US011084753B2

(12) United States Patent
Seto

(10) Patent No.: US 11,084,753 B2
(45) Date of Patent: Aug. 10, 2021

(54) GLASS COMPOSITION, GLASS SHEET, AND VEHICLE WINDOW INCLUDING GLASS SHEET

(71) Applicant: Nippon Sheet Glass Company, Limited, Tokyo (JP)

(72) Inventor: Hiromitsu Seto, Hyogo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 182 days.

(21) Appl. No.: 15/531,939

(22) PCT Filed: Dec. 2, 2015

(86) PCT No.: PCT/JP2015/005998
§ 371 (c)(1),
(2) Date: May 31, 2017

(87) PCT Pub. No.: WO2016/088374
PCT Pub. Date: Jun. 9, 2016

(65) Prior Publication Data
US 2017/0327409 A1  Nov. 16, 2017

(30) Foreign Application Priority Data

Dec. 3, 2014 (JP) .............................. JP2014-244546
Feb. 20, 2015 (JP) ................................. 2015-031352

(51) Int. Cl.
*C03C 4/08* (2006.01)
*B32B 17/06* (2006.01)
*C03C 3/087* (2006.01)
*B60J 1/00* (2006.01)
*C03C 3/095* (2006.01)

(52) U.S. Cl.
CPC .............. *C03C 4/085* (2013.01); *B32B 17/06* (2013.01); *B60J 1/00* (2013.01); *C03C 3/087* (2013.01); *C03C 3/095* (2013.01); *B32B 2309/105* (2013.01); *B32B 2605/006* (2013.01)

(58) Field of Classification Search
CPC ......... C03C 3/087; C03C 3/095; C03C 4/085; B32B 17/06; B60J 1/00
See application file for complete search history.

(56) References Cited

U.S. PATENT DOCUMENTS 4,822,684 A * 4/1989 Hotta ................ B32B 17/10018
428/426
5,352,640 A * 10/1994 Combes .................. C03C 3/078
501/71
5,650,365 A * 7/1997 Higby ..................... C03C 3/087
501/70
5,656,560 A * 8/1997 Stotzel .................... C03C 3/087
501/70
6,287,998 B1    9/2001 Seto et al.
6,395,660 B1    5/2002 Seto et al.
2002/0164487 A1  11/2002 Seto et al.
2009/0181843 A1* 7/2009 Seto ........................ C03C 3/087
501/64
2012/0038976 A1   2/2012 Kodaira et al.
2013/0105722 A1*  5/2013 Tsuzuki ................. C03C 3/087
252/62
2016/0229735 A1*  8/2016 Akada ..................... C03C 3/087

FOREIGN PATENT DOCUMENTS

| JP | H08245238 A | 9/1996 |
| JP | 10-114540 | 5/1998 |
| JP | 2000-203877 | 7/2000 |
| JP | 2000-247679 | 9/2000 |
| JP | 2001-064035 | 3/2001 |
| JP | 2002-255586 | 9/2002 |
| JP | 2003342038 | 12/2003 |
| JP | 2011-136846 | 7/2011 |
| JP | 2014-177365 | 9/2014 |
| JP | 2014-201450 | 10/2014 |
| WO | 9730948 A1 | 8/1997 |
| WO | 0117920 A1 | 3/2001 |
| WO | 2010131744 | 11/2010 |
| WO | WO-2015088026 A1 * | 6/2015 ............. C03C 3/087 |

OTHER PUBLICATIONS

Extended European Search Report issued for European Patent Application No. 15864614.1, dated Jul. 20, 2018, 12 pages.
International Search Report issued in International Application No. PCT/JP2015/005998 dated Feb. 16, 2016 (5 pages).
Written Opinion issued in International Application No. PCT/JP2015/005998 dated Feb. 16, 2016 (6 pages).

* cited by examiner

*Primary Examiner* — Laura A Auer

(74) *Attorney, Agent, or Firm* — Hamre, Schumann, Mueller & Larson, P.C.

(57) ABSTRACT

The present invention relates to an ultraviolet-shielding glass sheet including a glass composition based on soda-lime glass, the glass composition containing iron oxide and $TiO_2$ as coloring components. The glass sheet has a thickness of 1 to 5 mm, and an ultraviolet transmittance (Tuv 380) as determined at the thickness according to ISO 9050:1990 is 1.5% or less.

13 Claims, No Drawings

GLASS COMPOSITION, GLASS SHEET, AND VEHICLE WINDOW INCLUDING GLASS SHEET

TECHNICAL FIELD

The present invention relates to a glass composition having a very low ultraviolet transmittance, capable of substantially blocking transmission of ultraviolet light, and having a moderate visible transmittance, and to a relatively thin glass sheet formed from the glass composition. The present invention further palates to a window pane for vehicles and buildings, in particular for vehicles.

BACKGROUND ART

Window panes for vehicles and buildings are produced using soda-lime glass. Such window panes are required to have the function of shielding against ultraviolet light to prevent a person or article in a vehicle or room from experiencing sunburn or color fading.

Concerning the ultraviolet-absorbing function of soda-lime glass, a technique based on absorption by ferric oxide and absorption by an optionally added ultraviolet-absorbing component such as titanium oxide ($TiO_2$) or cerium oxide ($CeO_2$) has been disclosed (Patent Literature 1).

However, the glass composition disclosed in Patent Literature 1 can only exhibit an ultraviolet transmittance, which is a measure of the ultraviolet-shielding function, of at most 1.6% or less when the glass thickness is 4 mm. Window panes for vehicles are particularly required to be lightweight, and glass sheets for use in such window panes should be thin. If a glass sheet with a thickness of less than 4 mm is formed from the glass composition of Patent Literature 1, the glass sheet will have an even lower ultraviolet-shielding ability.

To solve the above problem, techniques have been disclosed which do not rely on the ultraviolet-shielding ability of a glass sheet itself but rather on the ultraviolet-shielding ability of a film (ultraviolet-shielding film) formed on the glass sheet (Patent Literature 2 and 3). The coated glass sheets disclosed in Patent Literature 2 and 3 have an ultraviolet transmittance of less than 1% at a wavelength of 380 nm, which indeed demonstrates the achievement of high ultraviolet-shielding ability. However, the step of forming a coating on a glass sheet is necessary, and the production cost is inevitably increased compared to when a glass sheet can by itself achieve a satisfactory ultraviolet-shielding ability.

CITATION LIST

Patent Literature

Patent Literature 1: JP 10-114540 A
Patent Literature 2: JP 2011-136846 A
Patent Literature 3: WO 2010/131744 A1

SUMMARY OF INVENTION

Technical Problem

It is therefore an object of the present invention to provide: a glass composition including soda-lime silicate glass, having a high ability to block transmission of ultraviolet light, and having a moderate visible transmittance; and a relatively thin glass sheet formed from the glass composition, the glass sheet being capable of, when used in a vehicle window pane, substantially blocking transmission of solar ultraviolet light.

Solution to Problem

The present invention provides an ultraviolet-shielding glass sheet including a glass composition based on soda-lime glass, the glass composition containing iron oxide and $TiO_2$ as coloring components. The glass sheet has a thickness of 1 to 5 mm, and an ultraviolet transmittance (Tuv 380) as determined at the thickness according to ISO 9050:1990 is 1.5% or less. For the ultraviolet-shielding glass sheet, it is preferable that the glass composition should contain, as base composition: 65 to 85 wt % $SiO_2$; 0 to 5 wt % $B_2O_3$; 0 to 5 wt % $Al_2O_3$; 0 to 20 wt % MgO; 0 to 20 wt % CaO; 10 to 20 wt % $Na_2O$; 0 to 5 wt % $K_2O$; and 0 to 0.5 wt % $SO_3$, and that the glass composition should contain, as coloring components: 0.2 to 2.0 wt % $TiO_2$; 1.0 to 3.0 wt % T-$Fe_2O_3$, where T-$Fe_2O_3$ represents total iron oxide calculated as $Fe_2O_3$; and 50 to 300 wt. ppm cobalt oxide (CoO) calculated as CoO. It is more preferable that the glass composition should contain, as base composition: 65 to 71 wt % $SiO_2$; 0 to 5 wt % $B_2O_3$; 1 to 3 wt % $Al_2O_3$; 3 to 10 wt % MgO; 5 to 15 wt % CaO; 10 to 15 wt % $Na_2O$; 0.5 to 2 wt % $K_2O$; and 0 to 0.5 wt % $SO_3$. The present invention further provides a strengthened glass sheet having a thickness of 1.0 to 3.5 mm and capable of blocking transmission of ultraviolet light in sunlight.

Advantageous Effects of Invention

The present invention provides a glass composition that enables a glass sheet to substantially block transmission of solar ultraviolet light without the aid of an additional coating even when the glass sheet has a small thickness which ranges from 1.0 to 3.5 mm, and further provides a glass sheet including the glass composition. The strengthened glass sheet of the present invention has a thickness of 1.0 to 3.5 mm and has an ultraviolet transmittance (Tuv 380) of 1.5% or less and a visible transmittance (YA) of 20 to 40%.

DESCRIPTION OF EMBODIMENTS

The following describes embodiments of the present invention but is not intended to limit the present invention to the embodiments described. The percent sign "%" used hereinafter to indicate the contents of various components refers to "wt %" unless otherwise specified, and the ratios between the contents are also expressed in terms of weight. "YA" refers to a visible transmittance as measured using CIE standard illuminant A, "Tuv 380" refers to an ultraviolet transmittance as determined according to ISO 9050:1990, and "Tuv 400" refers to an ultraviolet transmittance as determined according to ISO 13837:2008 convention A. These transmittances are those determined for glass sheets having specified thicknesses. "TG 2500" refers to a total solar energy transmittance as measured at wavelengths of 300 to 2500 nm, and "% T 1500" refers to a light transmittance as measured at a wavelength of 1500 nm. "DW" refers to a dominant wavelength as measured using CIE standard illuminant C, "Pe" refers to an excitation purity as measured using CIE standard illuminant C, and "a*" and "b*" refer to chromatic indices (chromatic coordinates) in the CIE 1976 (L*, a*, b*) color space (CIELAB) as defined in JIB Z 8781-4:2013.

"RO" is used herein to collectively refer to MgO, CaO, SrO, and BaO, while "$R_2O$" is used herein to collectively refer to $Li_2O$, $Na_2O$, and $K_2O$. In addition, the term "substantially free" is used herein to mean that the content of the component of interest is less than 0.1 wt %, preferably less than 0.05 wt %, and particularly preferably less than 0.01 wt %.

[Substances Contained as Base Composition]

First, substances contained as base composition in the glass composition and glass sheet of the present invention will be described.

($SiO_2$)

$SiO_2$ is a main component forming the glass structure. Given only the durability of the glass composition, $SiO_2$ may be contained in an amount of about 65% or more. If the content of $SiO_2$ is too high, melting of the glass material is difficult. The content of $SiO_2$ must thus be 85% or less. To achieve as low an ultraviolet transmittance as possible and at the same time a YA of 20 to 30%, the content of $SiO_2$ is preferably 71% or less.

($B_2O_3$)

$B_2O_3$ is not an essential component, but may be contained in an amount of up to 5%, for example, as a melting aid. If the content of $B_2O$ is too high, its volatility may cause production problems. The content of $B_2O_3$ is preferably less than 3.0% and particularly preferably less than 2.0%. The glass composition may be substantially free of $B_2O_3$.

($Al_2O_3$)

The content of $Al_2O_3$ is adjusted to the range of 0 to 5%. When the content of RO is low, the content of $Al_2O_3$ is preferably 1.0% or more and particularly preferably 1.2% or more to compensate for a decrease in the durability of the glass composition. However, if the content of $Al_2O_3$ is too high, melting of the glass material is likely to be difficult. In addition, $Al_2O_3$ reduces the thermal expansion coefficient. The content of $Al_2O_3$ is therefore preferably 3.0% or less when the glass composition is to be thermally strengthened (thermally tempered).

(MgO)

The content of MgO is adjusted to the range of 0 to 20%. MgO is a component that contributes to an increase in the durability of the glass composition and that can be used to adjust the devitrification temperature and viscosity of the composition. If the content of MgO is too high, the devitrification temperature may be so increased as to make impossible mass production by a float process. Specifically, the content of MgO is preferably 3 to 10%.

(CaO)

The content of CaO is adjusted to the range of 0 to 20%. CaO is also a component that contributes to an increase in the durability of the glass composition and that can be used to adjust the devitrification temperature and viscosity of the composition, although the extent of the effect of CaO is different from that of MgO. If the content of CaO is too low, a glass melt may have too high a viscosity which adversely affects the refining of the melt. The content of CaO is preferably 5 to 15%.

(SrO and BaO)

SrO and BaO are not essential components, but may each be contained in an amount of up to 1.0%, preferably in an amount of up to 0.5%, as components contributing, for example, to an increase in the durability of the glass composition. Addition of SrO and BaO requires the use of source materials that are more expensive than those for other components such as CaO. BaO should be carefully handled. The glass composition may therefore be substantially free of SrO and BaO.

(RO)

The content of RO (the total content of MgO, CaO, SrO, and BaO) is 20% or less and preferably 15% or less. The lower limit of the content of RO is not particularly defined. The content of RO is typically adjusted to 5% or more or even 10% or more to obtain the above desired effects of MgO and CaO.

It should be recalled that the glass composition may be substantially free of SrO and BaO.

($Li_2O$, $Na_2O$, and $K_2O$)

$Li_2O$, $Na_2O$, and $K_2O$, which are alkali metal oxides, are components serving as facilitators that help melt the glass material. $Na_2O$ is an alkali metal oxide the use of which is preferred in terms of production cost. The content of $Na_2O$ is adjusted to the range of 10 to 20%. The content of $Na_2O$ is preferably 10 to 15%. $K_2O$ is an optional component, and may be contained in an amount of up to 5%, preferably in an amount of up to 2%. The content of $K_2O$ may be, for example, 0.5 to 2.0%. $Li_2O$ is also an optional component, and may be contained in an amount of up to 1.0%. The glass composition may be substantially free of $Li_2O$.

($R_2O$)

The content of $R_2O$ (the total content of $Li_2O$, $Na_2O$, and $K_2O$) is adjusted to the range of 10 to 20%. The content of $R_2O$ is preferably in the range of 10 to 15%. If the content of $R_2O$ is too high, the durability of the glass composition may decrease.

($SO_3$)

$SO_3$ is an optional component that may be contained in an amount of up to 0.5% to facilitate refining of glass. The content of $SO_3$ is preferably in the range of 0.05 to 0.5%. If the content of $SO_3$ is too high, $SO_2$ resulting from decomposition of $SO_3$ may remain in the form of bubbles in the glass composition, or bubbles may be produced by reboiling. The content of $SO_3$ is more preferably 0.05 to 0.25%. $SO_3$ is typically incorporated into the glass composition by adding to the glass material a sulfuric acid salt as a component serving as a refining agent.

[Coloring Components]

Hereinafter, various coloring components in the glass composition and glass sheet of the present invention will be described. A particularly preferred embodiment in which the content of T-$Fe_2O_3$, which is defined herein to represent total iron oxide calculated as $Fe_2O_3$, is 2.0% or more and 3.0% or less will be referred to as Embodiment I, while a particularly preferred embodiment in which the content of T-$Fe_2O_3$, which represents total iron oxide calculated as $Fe_2O_3$, is 1.0% or more and less than 2.0% will be referred to as Embodiment II.

(Iron Oxide)

Iron oxide is present in the form of $Fe_2O_3$ or FeO in the glass composition. $Fe_2O_3$ has the function of absorbing ultraviolet light, while FeO has the function of absorbing near-infrared light. In the glass composition, the content of T-$Fe_2O_3$, which represents the total of these forms of iron oxide calculated as $Fe_2O_3$, is adjusted to the range of 1.0 to 3.0%. If the content of T-$Fe_2O_3$ is too high, radiant heat of flame for melting the glass material is so significantly absorbed by the upper part of the molten glass that the heat fails to reach the bottom of the melting furnace and heat the molten glass sufficiently. In Embodiment I, the content of T-$Fe_2O_3$ is 2.0% or more and 3.0% or less, preferably 2.1% or more and 3.0% or less, more preferably 2.3% or more and 2.9% or less, and even more preferably more than 2.4% and 2.9% or less. In Embodiment II, the content of T-$Fe_2O_3$ is 1.0% or more and less than 2.0% and preferably 1.2% or more and 1.8% or less. Furthermore, the amount of T-$Fe_2O_3$ contained in the glass sheet is adjusted to the range of 2.5 to 25 mg per cm² of the glass sheet. In Embodiment I, the amount of T-$Fe_2O_3$ contained in the glass sheet is preferably 14.0 mg or more and 25.0 mg or less, more preferably 14.0 mg or more and 21.0 mg or less, even more preferably 16.0 mg or more and 20.8 mg or less, and particularly preferably 18.0 mg or more and 20.8 mg or less, per cm² of the glass sheet. In Embodiment II, the amount of T-$Fe_2O_3$ contained in the glass sheet is preferably 2.5 mg or more and less than 14.0 mg, more preferably 7.0 mg or more and 13.4 mg or less, and even more preferably 8.0 mg or more and 12.0 mg or less, per cm² of the glass sheet.

The ratio of the content of FeO calculated as $Fe_2O_3$ to the content of T-$Fe_2O_3$ (this ratio may be referred to as FeO ratio) is adjusted to 5 to 30%. If the FeO ratio is too high, silica-rich streaks or silica scum is likely to be formed in the melt of the glass material. However, a high FeO ratio is advantageous in enhancing the near-infrared absorbing function. In Embodiment I, the FeO ratio is preferably 20 to 30%. In Embodiment II, the FeO ratio is preferably 6 to 29%.

($TiO_2$)

$TiO_2$ is an essential component which is one of the components responsible for the ultraviolet-absorbing function. $TiO_2$ has the function of adjusting the color of the glass from a bluish color to a greenish color when the FeO ratio is high. However, a higher content of $TiO_2$ makes the glass composition more likely to be yellowish. The content of $TiO_2$ in the glass composition must therefore be 0.2 to 2.2%. The content of $TiO_2$ in Embodiment I must be 0.9 to 2.2%, and is preferably 1.3 to 2.1%, more preferably 1.5 to 2.1%, and even more preferably 1.8 to 2.0%. The content of $TiO_2$ in Embodiment II is preferably 0.3 to 1.8% and more preferably 0.4 to 1.8%. Furthermore, the amount of $TiO_2$ contained in the glass sheet must be 0.5 to 25 mg per cm² of the glass sheet. In Embodiment I, the amount of $TiO_2$ contained in the glass sheet must be 3 to 25 mg per cm² of the glass sheet, and is preferably 5 to 25 mg, more preferably 8 to 23 mg, and even more preferably 10 to 20 mg, per cm² of the glass sheet. In Embodiment II, the amount of $TiO_2$ contained in the glass sheet is preferably 0.5 to 15 mg, more preferably 3.0 to 15 mg, and even more preferably 4.0 to 13 mg, per cm² of the glass sheet. In Embodiment II, the amount of $TiO_2$ contained in the glass sheet is preferably 5.0 to 15 mg, more preferably 5.0 to 14 mg, and even more preferably 5.0 to 13 mg per cm² of the glass sheet.

($CeO_2$)

$CeO_2$ is also one of the components responsible for ultraviolet-absorbing function, and is an essential component for Embodiment II. However, addition of $CeO_2$ causes an increase in materials cost. The content of $CeO_2$ in the glass composition must therefore be 0.2 to 2.0% and is preferably 0.2 to 1.5%. Furthermore, the amount of $CeO_2$ contained in the glass sheet is preferably 0.5 to 15 mg, more preferably 2.0 to 13 mg, and even more preferably 3.0 to 12 mg, per cm² of the glass sheet. In Embodiment I, the glass composition is preferably free of $CeO_2$.

(Total Content of T-$Fe_2O_3$, $TiO_2$, and $CeO_2$)

In the glass composition, the total content of T-$Fe_2O_3$, $TiO_2$, and $CeO_2$, which may be expressed as (T-$Fe_2O_3$+$TiO_2$+$CeO_2$), must be more than 3.0% and 6.0% or less. To achieve as low an ultraviolet transmittance as possible, the total content of T-$Fe_2O_3$, $TiO_2$, and $CeO_2$ is preferably 3.2 to 5.5%, more preferably 3.5 to 5.8%, and even more preferably 4.0 to 5.0%. In Embodiment I, the total content of T-$Fe_2O_3$, $TiO_2$, and $CeO_2$ is preferably 3.2 to 5.5% and more preferably 3.5 to 5.0% to achieve as low an ultraviolet transmittance as possible.

(Total Content of T-$Fe_2O_3$ and $TiO_2$)

In Embodiment I, the total content of T-$Fe_2O_3$ and $TiO_2$ in the glass composition must be 3.2 to 5.5% and is preferably 3.2 to 5.0% to achieve a low ultraviolet transmittance.

(Total Content of $TiO_2$ and $CeO_2$)

In Embodiment II, the total content of $TiO_2$ and $CeO_2$ in the glass composition must be 1.7% or more and is preferably 2% or more to achieve a low ultraviolet transmittance. The total amount of $TiO_2$ and $CeO_2$ contained in the glass sheet is preferably 5 mg or more, more preferably 10 to 30 mg, and even more preferably 13 to 20 mg, per cm² of the glass sheet.

(CoO)

Cobalt oxide, which is calculated as CoO, is an essential component for adjusting the transmission color of the glass sheet to a neutral color. CoO contributes to development of a color close to a neutral color when present with Se and/or NiO and $Fe_2O_3$, and also acts to control the visible transmittance. The content of CoO in the glass composition must be 50 to 300 wt. ppm. If the content of CoO is below this range, a desired color cannot be obtained, while if the content of CoO is above the range, the resulting color becomes too bluish, and the visible transmittance decreases. In Embodiment I, the content of CoO is 50 to 160 wt. ppm, preferably 50 to 155 wt. ppm, and more preferably 80 to 140 wt. ppm. In Embodiment II, the content of CoO is 150 to 300 wt. ppm, preferably 180 to 280 wt. ppm, and more preferably 205 to 261 wt. ppm. Furthermore, the amount of CoO contained in the glass sheet is preferably 37.5 to 255 μg per cm² of the glass sheet. In Embodiment I, the amount of the CoO contained in the glass sheet is more preferably 40 to 160 μg and even more preferably 45 to 140 μg per cm² of the glass sheet. In Embodiment II, the amount of CoO contained in the glass sheet is more preferably 100 to 200 μg and even more preferably 150 to 190 μg per cm² of the glass sheet.

In Embodiment I, the T-$Fe_2O_3$/CoO ratio is preferably 149 or more, more preferably 149 to 450, and even more preferably 150 to 350. In Embodiment II, the T-$Fe_2O_3$/CoO ratio is preferably 40 to 90 and more preferably 45 to 80.

(NiO)

NiO is an optional component for adjusting the visible transmittance and decreasing the excitation purity similarly to CoO. Both in Embodiment I and in Embodiment II, the glass composition may contain or be free of NiO. However, it is not preferable that the content of NiO be significantly high, because in this case the visible transmittance may decrease and the color of the glass may become too greenish. In addition, too high a content of NiO may cause formation of a nickel sulfide stone in the resulting glass product. It is therefore preferable for the glass composition of Embodiment I to be substantially free of NiO to prevent the decrease in visible transmittance. However, the glass composition may contain NiO in an amount of 50 wt. ppm or less, preferably in an amount of 30 wt. ppm or less, because the decrease in visible transmittance caused by such a small amount of NiO is negligible. The amount of NiO contained in the glass sheet of Embodiment I is preferably 50 μg or less and more preferably 30 μg or less per cm² of the glass sheet. The content of NiO in the glass composition of Embodiment II must be 200 wt. ppm or less, and is preferably 50 to 200 wt. ppm, more preferably 70 to 180 wt. ppm, and even more preferably 80 to 160 wt. ppm. In addition, the amount of NiO contained in the glass sheet of Embodiment II is preferably 150 μg or less, more preferably 50 to 150 μg, and even more preferably 60 to 140 μg, per cm² of the glass sheet.

(Se)

Se is also an component for adjusting the transmission color of the glass sheet to a neutral color, and is one of the essential components for Embodiment II. Se develops a pink color which, coupled with a complementary color attributed to CoO, reduces the excitation purity. However, an increase in the content of Se decreases the YA of the glass sheet. In Embodiment I, the content of Se is preferably 0 to 2 wt. ppm, and the glass composition is more preferably free of Se. The content of Se in the glass composition of Embodiment II must be 8 to 35 wt. ppm and is preferably 9 to 34 wt. ppm. Furthermore, in Embodiment II, the amount of Se contained in the glass sheet is preferably 2.5 to 30 µg, more preferably 5 to 25 µg, and even more preferably 10 to 20 µg, per $cm^2$ of the glass sheet.

(NiO/Se Ratio)

The NiO/Se ratio, which represents a ratio between the contents of NiO and Se which have been described above, must be 0 to 15 in terms of weight. This is because if this ratio is greater than 15, the color of the glass becomes too greenish. In an embodiment in which the glass composition contains NiO, this ratio is preferably 5 to 12, more preferably 5.5 to 11.0, and even more preferably 5.9 to 9.9.

(Other Minor Components)

The glass composition according to the present invention may further contain other minor components in addition to the various components described above. Examples of the minor components include $Mo_2O_3$, ZnO, and $SnO_2$. The total content of the minor components is preferably 5.0% or less, more preferably 2.0% or less, and particularly preferably 1.0% or less. The more preferred upper limit of the minor component content is 0.01% for $Mo_2O_3$, 0.1% for ZnO, and 1.0% for $SnO_2$. The glass composition according to the present invention is preferably substantially free of any component other than the above various components and minor components, and may be substantially free of any component other than the above various components ($SiO_2$ through Se which have been sequentially described above).

The content of an oxide of a metal that can have different valences in the glass composition is calculated herein by assuming that the metal of the oxide has a valence specified herein, with the exception of the content of iron oxide.

[Optical Properties]

The Tuv 380 (ultraviolet transmittance) employed herein is an ultraviolet transmittance as determined according to ISO 9050:1990, the Tuv 400 (ultraviolet transmittance) employed herein is an ultraviolet transmittance as determined according to ISO 13837:2008 convention A, the YA (visible transmittance) employed herein is a visible transmittance as measured using CIE standard illuminant A according to JIS R 3106:1998, and the TG (solar transmittance) employed herein is a solar transmittance as measured according to JIS R 3106:1998.

The wavelength range of ultraviolet light in solar light employed for ultraviolet transmittance measurement differs between Tuv 380 and Tuv 400. The Tuv 380 is measured in the wavelength range up to 380 nm, while the Tuv 400 is measured in the wavelength range up to 400 nm. That is, the Tuv 400 allows the ultraviolet-shielding performance to be evaluated in a longer-wavelength range than the Tuv 380 allows.

An embodiment of the present invention provides a glass sheet having a moderate YA which ranges from 20 to 30%, having a very low Tuv 380 which is 1.5% or less, capable of substantially blocking transmission of ultraviolet light, and having a thickness of 1.0 to 3.5 mm, preferably 1.5 to 3.0 mm, more preferably 2.0 to 3.0 mm. In general, the glass composition according to the present invention is formed into a glass sheet of predetermined thickness, which is annealed to give the intended product; this production process is performed by mass production equipment which typically employs a float process. The glass sheet is preferably subjected to a strengthening process such as thermal tempering or chemical strengthening.

The glass sheet according to an embodiment of the present invention has a Tuv 380 of 1.5% or less, preferably 1.0% or less, more preferably 0.8% or less, and requires no additional coating involved in the ultraviolet-filtering properties. When the glass sheet having a Tuv 380 of 1.0% or less is used in a window for a vehicle or building, the window is endowed with the ability to substantially block transmission of ultraviolet light in sunlight coming from the outside of the vehicle or building. Specifically, when standard sunlight as defined in JIS C 8904:2011 (for this standard sunlight, the air mass is 1.5, and the integrated intensity over the entire wavelength range is 1 $kW·m^{-2}$) is applied to the window, the window is capable of reducing the intensity of ultraviolet light having a wavelength of 400 nm or less and reaching the interior of the vehicle or building to 0.45 $W·m^{-2}$ or less. Reducing the ultraviolet intensity to such a level makes it possible to efficiently prevent sunburn of human skin even when sunlight continues to hit the human skin for 6 hours. In particular, when such glass sheets are used in all windows set in opening portions of a vehicle, the vehicle can substantially block entry of ultraviolet light into the interior of the vehicle and effectively prevent sunburn of occupants, regardless of the change in the direction of the vehicle or in the azimuth of the sun.

As described below, the glass sheet of the present invention tends to have a decreased Tuv 380 when thermally tempered. The thermally tempered glass sheet of the present invention is accordingly capable of blocking transmission of ultraviolet light more effectively.

In an embodiment of the present invention, the Tuv 400 of the glass sheet is preferably 5.0% or less and more preferably 2.0% or less. Thus, the glass sheet of the present invention has a high ability to shield against long-wavelength ultraviolet light.

In an embodiment of the present invention, the glass sheet has a moderate YA which ranges from 20 to 40%, preferably from 20 to 35%. When the glass sheet having such a moderate YA is used in a window for a vehicle or building, the window makes the interior of the vehicle or building difficult to see from the outside of the vehicle or building while allowing the outside of the vehicle or building to be easily seen from the interior of the vehicle or building. That is, the window is capable of preventing the interior of the vehicle or building being watched from outside and thus offering good privacy protection. The glass sheet which enables such good privacy protection is suitable for use in rear windows of vehicles or automobiles, in particular in rear side door windows, rear triangle windows, and rear windshields of automobiles.

For window panes of automobiles, the lower limit of the YA is legally regulated, and different values of the lower limit are specified depending on where the window panes are mounted. Specifically, the YA is required to be 70% or more for front windshields, front side door windows, and front triangle windows. A possible option to meet such requirements is to provide a vehicle in which: the strengthened glass sheets according to the present invention are used in the back side door windows, rear triangle windows, and rear windshield as described above; coated glass sheets as disclosed in Patent Literature 2 or 3 are used in the front side door windows and front triangle windows; and laminated glass including a known interlayer is used in the front windshield.

TG is a measure of transmission of energy of sunlight. A glass sheet having a lower TG can decrease the energy of sunlight passing therethrough; thus, such a glass sheet, when used in a vehicle or building, can reduce the temperature increase of the interior of the vehicle or building. In an embodiment of the present invention, the TG of the glass sheet is preferably 10 to 45%, more preferably 15 to 45%, and even more preferably 20 to 30%. The glass sheet is therefore effective in pkevonting the temperature increase as mentioned above.

[Thermal Tempering]

Thermal tempering (thermal strengthening) is a known process for increasing the strength of a glass sheet and is accomplished by heating the glass sheet and then blowing a gas onto the surface of the glass sheet to quench the glass sheet and form a compressive stress layer in its surface. The temperature for heating the glass sheet is typically equal to or higher than the strain point of the glass composition forming the glass sheet, and is equal to or lower than the melting point of the composition. The present invention in another aspect provides a strengthened glass sheet having a thickness of 1.0 to 3.5 mm, the strengthened glass sheet being obtained by thermally tempering a glass sheet formed from the glass composition according to the present invention. In general, the Tuv 380 of the glass sheet formed from the glass composition according to the present invention tends to decrease as a result of thermal tempering. In the strengthened glass sheet, the value of a* is preferably −15.0 to −3.0 and more preferably −14.0 to −4.0. The value of b* is preferably −10.0 to 30.0 and more preferably −8.0 to 25.0.

It has been confirmed that the FeO ratio of a glass composition remains substantially unchanged before and after thermal tempering. It is therefore inferred that the change in optical properties accompanying thermal tempering is not due to a change in FeO ratio but rather due to a shift of the absorption peak of FeO caused by the internal structure of the high-temperature glass composition being fixed by thermal tempering.

The compressive stress in the surface of the strengthened glass sheet is, for example, but not limited to, 80 to 140 MPa, in particular 90 to 110 MPa.

The present invention further provides a laminated glass sheet including a first glass sheet, an interlayer for glass lamination, and a second glass sheet. At least one of the first and second glass sheets is the ultraviolet-shielding glass sheet described above. The other of the glass sheets may be formed of conventionally known glass (such as common, clear soda-lime glass).

The present invention further provides a vehicle window pane including the above strengthened glass sheet or the above laminated glass sheet. The vehicle window pane is suitable for use, in particular, in rear side door windows, rear triangle windows, and rear windshields of automobiles.

EXAMPLES

Hereinafter, the present invention will be described in more detail with reference to examples. The following examples as well as the foregoing description are given merely for the purpose of illustrating preferred embodiments of the present invention.

Glass material batches were obtained by blending silica sand, dolomite, limestone, soda ash, salt cake, potassium carbonate, carbon, iron oxide, titanium oxide, cerium oxide, cobalt oxide, nickel oxide, and selenium to give compositions of glass as shown in Tables 1 to 4. Each of these batches was melted by an electric furnace at 1450° C., left in place for 4 hours, and then cast on a stainless steel plate. The glass sheet thus obtained was left in an annealing furnace held at 650° C. for 30 minutes, after which the annealing furnace was turned off to slowly cool the glass sheet to room temperature in the furnace. The rate of cooling from 650 to 550° C. in this annealing was about 0.1° C./sec. The resulting annealed glass sheet was ground to a predetermined thickness.

Next, each annealed glass sheet was subjected to thermal tempering. The thermal tempering was carried out as follows: The glass sheet was left in an electric furnace set at 700° C. for 180 seconds, after which the glass sheet was taken out of the electric furnace and quenched by exposing the glass sheet to blow of air at ordinary temperature. The rate of cooling from 650 to 550° C. in this quenching was 80 to 100° C./sec. The resulting strengthened glass sheet had a surface compressive stress ranging from 90 to 110 MPa.

For each of the glass sheets (annealed glass sheets and strengthened glass sheets), the following characteristic indices were measured: visible transmittance (YA) as measured using CIE standard illuminant A; total solar energy transmittance (TG); ultraviolet transmittances (Tuv 380 and Tuv 400) as determined according to ISO; dominant wavelength (DW) as measured using CIE standard illuminant C; excitation purity (Pe); and chromaticity (a*, b*) in the L*a*b* color system. The characteristic indices measured are shown in Table 2 and Table 4. In the tables, the total content is not 100% for some cases, which is due to the difference in the number of significant figures and rounding off.

(Composition Analysis)

The components of glass samples obtained were quantified by fluorescent X-ray analysis and chemical analysis. The results are shown in Table 1 and Table 3.

The properties of the annealed glass sheets will be discussed first. In Comparative Example 1, where $CeO_2$ was not contained, the Tuv 380 was 1.6% even at a thickness of 4 mm, and a Tuv 380 of 1.5% or more was not achieved at any thickness in the range of 1.0 to 3.5 mm.

By contrast, in Examples 1 to 13, 20, 21, and 23 to 25, both a Tuv 380 of 1.0% or less and a YA of 20 to 30% were successfully achieved at thicknesses in the range of 2.5 to 3.5 mm. Additionally, in Examples 1 to 13, 20, 21, and 23 to 25, a Tuv 400 of 5.0% or less was successfully achieved as well. In particular, in Examples 6, 7, 23, and 25, the Tuv 380 was successfully reduced to 0.6% or less, despite a thickness of 2.5 mm. Furthermore, in Examples 6, 7, 23, and 25, the Tuv 400 was successfully reduced to 3.0% or less.

In Examples 6, 10, and 13, where the thicknesses of the glass sheets were 2.5 mm, 3.5 mm, and 2.8 mm, respectively, both the Tuv 380 and the Tuv 400 were 1.0% or less, which demonstrates that very high ultraviolet-shielding ability was exhibited.

In all of Examples 10 to 25, the thermal tempering successfully yielded values of Tuv 380 lower than those of the annealed glass sheets without causing a significant change in YA; specifically; a Tuv 380 of 1.5% or less was successfully obtained at thicknesses in the range of 2.5 to 3.5 mm. In Examples 1 to 13, 16, 18, and 20 to 25, a Tuv 400 of 5.0% or less was successfully achieved as well. In particular, in Examples 10 to 13, the Tuv 400 was successfully reduced to 2.0% or less. In Examples 10, 12, and 13, the Tuv 400 was successfully reduced to 1.0% or less.

When 3.5-mm-thick annealed glass sheets and 3.5-mm-thick thermally-tempered strengthened glass sheets are obtained using the glass compositions according to Examples 23 and 25, the annealed glass sheets have a Tuv 400 of 0.8%, and the thermally-tempered strengthened glass sheets have a Tuv 400 of 0.7%. That is, the strengthened glass sheet of the present invention can exhibit very high ultraviolet-shielding performance demonstrated by an ultraviolet transmittance of 1.0% or less, in either case of using Tuv 380 or Tuv 400 as the measure of the ultraviolet transmittance.

It can be expected, from the behaviors of the thermally-tempered strengthened glass sheets according to Examples 10 to 25, that the Tuv 380 and Tuv 400 of the glass sheets according to Examples 1 to 9 can be decreased by thermal tempering without a significant change in YA. In particular, it can be expected that both the Tuv 380 and the Tuv 400 can be reduced to 1.0% or less in Examples 1, 3 to 6, 8, and 9.

TABLE 1

| Composition of glass | Examples | | | | | | | | | | | | |
|---|---|---|---|---|---|---|---|---|---|---|---|---|---|
| wt % | 1 | 2 | 3 | 4 | 5 | 6 | 7 | 8 | 9 | 10 | 11 | 12 | 13 |
| $SiO_2$ | 67.4 | 69.2 | 69.1 | 69.4 | 69.2 | 68.7 | 67.5 | 67.7 | 67.3 | 69.1 | 69.1 | 68.9 | 68.6 |
| $Al_2O_3$ | 1.72 | 1.41 | 1.40 | 1.41 | 1.41 | 1.41 | 1.72 | 1.72 | 1.71 | 1.47 | 1.49 | 1.57 | 1.56 |
| MgO | 4.28 | 3.41 | 3.41 | 3.42 | 3.41 | 3.13 | 4.28 | 4.26 | 4.27 | 3.19 | 3.20 | 3.19 | 3.18 |
| CaO | 8.77 | 7.52 | 7.51 | 7.54 | 7.52 | 7.50 | 4.71 | 8.73 | 8.76 | 7.10 | 7.15 | 7.14 | 7.07 |
| $Na_2O$ | 12.93 | 13.54 | 13.52 | 13.56 | 13.54 | 13.47 | 12.94 | 13.03 | 12.91 | 13.40 | 13.30 | 13.40 | 13.30 |
| $K_2O$ | 1.14 | 0.93 | 0.93 | 0.93 | 0.93 | 0.94 | 1.14 | 1.14 | 1.14 | 0.79 | 0.80 | 0.84 | 0.86 |
| $Fe_2O_3$ | 2.31 | 2.20 | 2.20 | 2.10 | 2.15 | 2.90 | 2.50 | 2.30 | 2.30 | 2.46 | 2.59 | 2.68 | 2.79 |
| ferrous % | 21.0 | 23.1 | 25.2 | 25.4 | 27.6 | 22.8 | 24.4 | 23.5 | 23.3 | 21.9 | 22.2 | 22.5 | 22.1 |
| $SO_3$ | 0.17 | 0.18 | 0.18 | 0.17 | 0.16 | 0.17 | 0.17 | 0.17 | 0.17 | 0.25 | 0.24 | 0.23 | 0.23 |
| $CeO_2$ | 0 | 0 | 0 | 0 | 0 | 0 | 0 | 0 | 0 | 0 | 0 | 0 | 0 |
| $TiO_2$ | 1.49 | 1.60 | 1.70 | 1.50 | 1.60 | 1.80 | 1.00 | 1.00 | 1.40 | 1.84 | 1.80 | 1.85 | 1.83 |
| CoO (wt. ppm) | 155 | 95 | 95 | 95 | 95 | 95 | 140 | 110 | 50 | 105 | 105 | 95 | 95 |
| NiO (wt. ppm) | 0 | 0 | 0 | 0 | 0 | 0 | 0 | 0 | 0 | 0 | 0 | 0 | 0 |
| Se (wt. ppm) | 0 | 0 | 0 | 0 | 0 | 0 | 0 | 0 | 0 | 0 | 0 | 0 | 0 |
| $TiO_2 + CeO_2$ | 1.49 | 1.60 | 1.70 | 1.50 | 1.60 | 1.80 | 1.00 | 1.00 | 1.40 | 1.84 | 1.80 | 1.85 | 1.83 |
| $Fe_2O_3 + TiO_2$ | 3.80 | 3.80 | 3.90 | 3.60 | 3.75 | 4.70 | 3.50 | 3.30 | 3.70 | 4.30 | 4.39 | 4.53 | 4.62 |
| $Fe_2O_3 + TiO_2 + CeO_2$ | 3.80 | 3.80 | 3.90 | 3.60 | 3.75 | 4.70 | 3.50 | 3.30 | 3.70 | 4.30 | 4.39 | 4.53 | 4.62 |
| NiO/Se | — | — | — | — | — | — | — | — | — | — | — | — | — |
| $Fe_2O_3$/CoO | 149 | 232 | 232 | 221 | 226 | 305 | 179 | 209 | 460 | 234 | 247 | 282 | 294 |
| density g/cm³ | 2.57 | 2.57 | 2.57 | 2.57 | 2.57 | 2.57 | 2.57 | 2.57 | 2.57 | 2.57 | 2.57 | 2.57 | 2.57 |

TABLE 2

| Amounts of coloring components | Examples | | | | | | | | | | | | |
|---|---|---|---|---|---|---|---|---|---|---|---|---|---|
| per unit area | 1 | 2 | 3 | 4 | 5 | 6 | 7 | 8 | 9 | 10 | 11 | 12 | 13 |
| Thickness (mm) | 3.5 | 3.5 | 3.5 | 3.5 | 3.5 | 2.5 | 2.5 | 3.5 | 3.5 | 3.5 | 2.8 | 2.8 | 2.8 |
| $Fe_2O_3$ (mg/cm²) | 20.8 | 19.8 | 19.8 | 18.9 | 19.3 | 18.6 | 16.1 | 20.7 | 20.7 | 22.1 | 18.6 | 19.0 | 20.1 |
| $CeO_2$ (mg/cm²) | 0 | 0 | 0 | 0 | 0 | 0 | 0 | 0 | 0 | 0 | 0 | 0 | 0 |
| $TiO_2$ (mg/cm²) | 13.4 | 14.4 | 15.3 | 13.5 | 14.4 | 11.6 | 6.4 | 9.0 | 12.6 | 16.6 | 12.9 | 13.1 | 13.2 |
| CoO (μg/cm²) | 139 | 85 | 85 | 85 | 85 | 61 | 90 | 99 | 45 | 94 | 75 | 67 | 68 |
| NiO (μg/cm²) | 0 | 0 | 0 | 0 | 0 | 0 | 0 | 0 | 0 | 0 | 0 | 0 | 0 |
| Se (μg/cm²) | 0 | 0 | 0 | 0 | 0 | 0 | 0 | 0 | 0 | 0 | 0 | 0 | 0 |
| $TiO_2 + CeO_2$ | 13.4 | 14.4 | 15.3 | 13.5 | 14.4 | 11.6 | 6.4 | 9.0 | 12.6 | 16.6 | 12.9 | 13.1 | 13.2 |
| Annealed glass sheet | | | | | | | | | | | | | |
| YA (%) | 24.0 | 29.4 | 26.4 | 28.7 | 25.6 | 24.5 | 29.3 | 24.7 | 30.3 | 26.1 | 31.2 | 30.0 | 28.0 |
| $TG_{2500}$ (%) | 13.4 | 14.7 | 12.7 | 14.0 | 11.8 | 13.0 | 16.6 | 12.5 | 14.0 | 12.7 | 16.3 | 15.4 | 14.2 |
| $Tuv_{380}$ (%) | 0.15 | 0.28 | 0.08 | 0.30 | 0.19 | 0.30 | 0.38 | 0.13 | 0.10 | 0.11 | 0.25 | 0.20 | 0.13 |
| $Tuv_{400}$ (%) | 1.1 | 1.7 | 1.1 | 1.8 | 1.2 | 0.8 | 2.0 | 1.1 | 0.9 | 0.9 | 1.5 | 1.3 | 1.0 |
| DW (nm) | 556.7 | 558.3 | 561.0 | 556.9 | 558.9 | 568.5 | 557.4 | 558.3 | 565.0 | 562.7 | 564.3 | 564.8 | 565.4 |
| Pe (%) | 18.6 | 20.2 | 25.6 | 19.1 | 23.2 | 38.1 | 16.6 | 20.5 | 32.4 | 28.4 | 25.8 | 27.3 | 29.8 |
| % $T_{1500}$ | — | — | 9.56 | — | — | — | — | — | — | 10.0 | 14.0 | 13.2 | 12.3 |
| a* | −15.3 | −15.5 | −15.6 | −15.8 | −16.2 | — | — | −15.5 | −16.4 | −15.1 | −13.7 | −13.7 | −13.6 |
| b* | 14.7 | 16.6 | 19.6 | 15.8 | 18.1 | — | — | 16.1 | 25.8 | 21.4 | 20.6 | 21.4 | 22.6 |
| Thermally-tempered strengthened glass sheet | | | | | | | | | | | | | |
| YA (%) | — | — | — | — | — | — | — | — | — | 26.2 | 31.3 | 30.1 | 28.1 |
| $TG_{2500}$ (%) | — | — | — | — | — | — | — | — | — | 12.8 | 16.4 | 15.5 | 14.3 |
| $Tuv_{380}$ (%) | — | — | — | — | — | — | — | — | — | 0.00 | 0.14 | 0.11 | 0.074 |
| $Tuv_{400}$ (%) | — | — | — | — | — | — | — | — | — | 0.7 | 1.2 | 1.0 | 0.7 |
| DW (nm) | — | — | — | — | — | — | — | — | — | 563.9 | 565.3 | 565.3 | 566.3 |
| Pe (%) | — | — | — | — | — | — | — | — | — | 31.2 | 28.2 | 29.8 | 32.6 |
| % $T_{1500}$ | — | — | — | — | — | — | — | — | — | 9.3 | 13.2 | 12.4 | 11.4 |
| a* | — | — | — | — | — | — | — | — | — | −14.9 | −13.6 | −13.6 | −18.5 |
| b* | — | — | — | — | — | — | — | — | — | 23.2 | 22.4 | 23.2 | 24.5 |

TABLE 3

| Composition of glass wt % | Examples | | | | | | | | | | | | Comparative Example |
|---|---|---|---|---|---|---|---|---|---|---|---|---|---|
| | 14 | 15 | 16 | 17 | 18 | 19 | 20 | 21 | 22 | 23 | 24 | 25 | 1 |
| $SiO_2$ | 69.4 | 69.4 | 69.5 | 69.4 | 69.3 | 69.2 | 69.2 | 69.4 | 66.8 | 65.1 | 67.3 | 65.7 | 69.0 |
| $Al_2O_3$ | 1.49 | 1.49 | 1.49 | 1.48 | 1.48 | 1.48 | 1.48 | 1.48 | 1.70 | 1.84 | 1.71 | 1.86 | 1.6 |
| MgO | 3.74 | 3.74 | 3.74 | 3.40 | 3.73 | 3.73 | 3.72 | 3.73 | 4.33 | 4.70 | 4.32 | 4.70 | 3.6 |
| CaO | 7.66 | 7.66 | 7.67 | 7.66 | 7.65 | 7.63 | 7.63 | 7.65 | 9.04 | 9.82 | 8.85 | 9.62 | 8.4 |
| $Na_2O$ | 13.40 | 13.40 | 13.38 | 13.36 | 13.34 | 13.32 | 13.31 | 13.35 | 13.07 | 13.08 | 13.05 | 12.98 | 13.1 |
| $K_2O$ | 0.98 | 0.98 | 0.98 | 0.98 | 0.98 | 0.98 | 0.98 | 0.98 | 1.13 | 1.22 | 1.14 | 1.24 | 0.9 |
| $Fe_2O_3$ | 1.30 | 1.30 | 1.33 | 1.25 | 1.28 | 1.31 | 1.46 | 1.46 | 1.45 | 1.57 | 1.45 | 1.58 | 1.40 |
| ferrous % | 6.8 | 9.5 | 23.0 | 24.7 | 22.0 | 22.8 | 19.4 | 25.7 | 22.0 | 21.0 | 28.1 | 29.0 | 30 |
| $CeO_2$ | 1.40 | 1.40 | 1.20 | 1.24 | 1.24 | 1.21 | 1.45 | 0.44 | 1.20 | 1.30 | 0.40 | 0.44 | 0 |
| $TiO_2$ | 0.45 | 0.45 | 0.50 | 0.64 | 0.77 | 0.91 | 0.82 | 1.33 | 1.10 | 1.19 | 1.60 | 1.74 | 1.6 |
| CoO (wt. ppm) | 250 | 250 | 195 | 195 | 205 | 203 | 182 | 205 | 220 | 239 | 240 | 261 | 115 |
| NiO (wt. ppm) | 0 | 0 | 147 | 149 | 148 | 146 | 88 | 89 | 100 | 109 | 100 | 109 | 0 |
| Se (wt. ppm) | 30 | 30 | 11 | 12 | 14 | 13 | 15 | 9 | 11 | 12 | 12 | 13 | 2 |
| $TiO_2 + CeO_2$ | 1.85 | 1.85 | 1.70 | 1.88 | 2.01 | 2.12 | 2.27 | 1.77 | 2.30 | 2.49 | 2.00 | 2.18 | 1.60 |
| $Fe_2O_3 + TiO_2$ | 1.75 | 1.75 | 1.83 | 1.89 | 2.05 | 2.22 | 2.28 | 2.79 | 2.55 | 2.77 | 3.05 | 3.32 | 3.00 |
| $Fe_2O_3 + TiO_2 + CeO_2$ | 3.15 | 3.15 | 3.03 | 3.13 | 3.29 | 3.43 | 3.73 | 3.23 | 3.75 | 4.07 | 3.45 | 3.75 | 3.00 |
| NiO/Se | 0 | 0 | 13.4 | 12.4 | 10.6 | 11.2 | 5.9 | 9.9 | 9.1 | 9.1 | 8.3 | 8.4 | 0 |
| $Fe_2O_3$/CoO | 52 | 52 | 68 | 64 | 62 | 65 | 80 | 71 | 66 | 66 | 60 | 60 | 122 |
| density g/cm³ | 2.57 | 2.57 | 2.57 | 2.57 | 2.57 | 2.57 | 2.57 | 2.57 | 2.58 | 2.60 | 2.55 | 2.55 | 2.57 |

TABLE 4

| Amounts of coloring components per unit area | Examples | | | | | | | | | | | | Comparative Example |
|---|---|---|---|---|---|---|---|---|---|---|---|---|---|
| | 14 | 15 | 16 | 17 | 18 | 19 | 20 | 21 | 22 | 23 | 24 | 25 | 1 |
| Thickness (mm) | 3.5 | 3.0 | 3.5 | 3.5 | 3.5 | 3.0 | 3.0 | 3.5 | 2.5 | 2.5 | 3.0 | 2.5 | 4.0 |
| $Fe_2O_3$ (mg/cm²) | 11.7 | 10.0 | 12.0 | 11.2 | 11.5 | 10.1 | 11.3 | 13.1 | 9.4 | 10.3 | 11.1 | 10.0 | 14.4 |
| $CeO_2$ (mg/cm²) | 12.6 | 10.8 | 10.8 | 11.2 | 11.2 | 9.3 | 11.2 | 4.0 | 7.7 | 8.5 | 3.1 | 2.8 | 0 |
| $TiO_2$ (mg/cm²) | 4.0 | 3.5 | 4.5 | 5.8 | 6.9 | 7.0 | 6.3 | 12.0 | 7.1 | 7.8 | 12.2 | 11.1 | 16.5 |
| CoO (μg/cm²) | 225 | 193 | 175 | 175 | 184 | 157 | 140 | 184 | 142 | 156 | 184 | 166 | 118 |
| NiO (μg/cm²) | 0 | 0 | 132.3 | 134.1 | 133.2 | 112.6 | 67.9 | 80.1 | 64.5 | 71.1 | 76.5 | 69.5 | 0 |
| Se (μg/cm²) | 27.0 | 23.1 | 9.9 | 10.8 | 12.6 | 10.0 | 11.6 | 8.1 | 7.1 | 7.8 | 9.2 | 8.3 | 2.1 |
| $TiO_2 + CeO_2$ | 16.6 | 14.3 | 15.3 | 16.9 | 18.1 | 16.4 | 17.5 | 15.9 | 14.8 | 16.3 | 15.3 | 13.9 | 16.5 |
| Annealed glass sheet | | | | | | | | | | | | | |
| YA (%) | 29.6 | 25.8 | 21.4 | 22.4 | 22.0 | 25.6 | 26.2 | 21.4 | 28.8 | 24.3 | 22.0 | 22.4 | 28.0 |
| $TG_{2500}$ (%) | 44.2 | 37.0 | 19.1 | 19.4 | 20.6 | 23.7 | 24.8 | 16.1 | 26.8 | 24.1 | 17.3 | 18.2 | 16.1 |
| $Tuv_{380}$ (%) | 1.09 | 1.13 | 1.09 | 1.20 | 1.15 | 1.38 | 1.04 | 0.86 | 1.05 | 0.43 | 0.75 | 0.57 | 1.6 |
| $Tuv_{400}$ (%) | 6.1 | 7.5 | 4.8 | 5.2 | 4.9 | 5.5 | 4.6 | 3.6 | 4.6 | 2.4 | 3.7 | 2.5 | — |
| DW (nm) | 485.8 | 494.3 | 543.9 | 531.5 | 545.2 | 556.7 | 567.9 | 547.6 | 569.4 | 572.5 | 558.5 | 567.8 | 525 |
| Pe (%) | 11.2 | 3.4 | 5.3 | 4.0 | 5.2 | 7.4 | 13.3 | 7.8 | 15.6 | 24.7 | 11.9 | 20.6 | 9.8 |
| % $T_{1500}$ | 54.7 | 48.0 | 23.1 | 22.4 | 25.1 | 28.9 | 31.1 | 17.7 | 34.4 | 33.8 | 20.7 | 23.6 | — |
| a* | −6.4 | −4.1 | −7.3 | −7.7 | −6.9 | −6.6 | −4.9 | −9.5 | −4.9 | −3.9 | −8.9 | −7.1 | — |
| b* | −6.4 | −0.6 | 4.5 | 3.7 | 4.4 | 6.1 | 9.8 | 6.5 | 11.6 | 16.7 | 9.1 | 14.3 | — |
| Thermally-tempered strengthened glass sheet | | | | | | | | | | | | | |
| YA (%) | 31.4 | 30.0 | 21.4 | 22.4 | 21.8 | 25.6 | 26.7 | 21.5 | 29.3 | 24.9 | 22.3 | 23.1 | — |
| $TG_{2500}$ (%) | 44.0 | 38.1 | 19.2 | 19.6 | 20.7 | 23.9 | 25.0 | 16.4 | 27.3 | 24.4 | 17.6 | 19.0 | — |
| $Tuv_{380}$ (%) | 0.68 | 0.96 | 0.73 | 0.84 | 0.79 | 1.00 | 0.75 | 0.60 | 0.76 | 0.30 | 0.53 | 0.45 | — |
| $Tuv_{400}$ (%) | 5.0 | 7.6 | 3.9 | 4.3 | 4.1 | 4.7 | 3.9 | 3.0 | 3.9 | 2.0 | 2.7 | 2.0 | — |
| DW (mm) | 486.6 | 487.6 | 548.1 | 538.7 | 549.9 | 558.2 | 567.5 | 552.0 | 569.1 | 572.0 | 560.4 | 568.1 | — |
| Pe (%) | 12.7 | 9.9 | 6.0 | 4.6 | 5.9 | 7.9 | 13.3 | 9.0 | — | 24.1 | 12.9 | — | — |
| % $T_{1500}$ | 52.2 | 45.2 | 21.6 | 21.2 | 23.6 | 27.3 | 29.4 | 16.5 | 32.7 | 31.6 | 19.3 | 22.4 | — |
| a* | −8.4 | −7.1 | −7.2 | −7.5 | −6.7 | −6.5 | −5.2 | −9.3 | −5.1 | −4.4 | −8.7 | −6.9 | — |
| b* | −6.9 | −4.9 | 5.0 | 4.2 | 4.9 | 6.4 | 9.9 | 7.3 | 11.6 | 16.5 | 9.7 | 14.3 | — |

INDUSTRIAL APPLICABILITY

A glass sheet formed from the glass composition according to the present invention has a thickness of 1.0 to 3.5 mm and has both a moderate visible transmittance YA which ranges from 20 to 35% and a very low ultraviolet transmittance Tuv 380 which is 1.5% or less as determined according to ISO 9050:1990. This glass sheet is preferably a strengthened glass sheet, and is suitable for use in members that are desirably capable of substantially blocking transmission of ultraviolet light, such as window panes for vehicles and buildings, in particular rear side door windows, rear triangle windows, and rear windshields of automobiles.

The invention claimed is:

1. An ultraviolet-shielding glass sheet comprising a glass composition based on soda-lime glass, the glass composition comprising iron oxide and $TiO_2$ as coloring components, wherein the glass sheet has a thickness of 1 to 5 mm, and at the thickness, an ultraviolet transmittance (Tuv 380) as determined according to ISO 9050:1990 is 1.5% or less, an ultraviolet transmittance (Tuv 400) as determined according to ISO 13837:2008 convention A is 2.0% or less, a visible transmittance (YA) as measured using CIE standard illuminant A according to JIS R 3106:1998 at the thickness of 3.5 mm is 26.1 to 40%, and a solar transmittance (TG) as measured according to JIS R 3106:1998 is 10 to 45%, wherein the glass composition comprises, as base composition:
65 to 85 wt % $SiO_2$;
0 to 5 wt % $B_2O_3$;
0 to 5 wt % $Al_2O_3$;
0 to 20 wt % MgO;
0 to 20 wt % CaO;
10 to 20 wt % $Na_2O$;
0 to 5 wt % $K_2O$; and
0 to 0.5 wt % $SO_3$, the glass composition comprises, as coloring components:
0.9 to 2.2 wt % $TiO_2$;
more than 2.4 wt % and 3.0 wt % or less $T\text{-}Fe_2O_3$, where $T\text{-}Fe_2O_3$ represents total iron oxide calculated as $Fe_2O_3$; and
50 to 95 wt. ppm cobalt oxide (CoO) calculated as CoO;

the glass composition is substantially free of NiO, and the total content of $T\text{-}Fe_2O_3$, $TiO_2$, and $CeO_2$ is more than 4.0% and 6.0% or less.

2. The ultraviolet-shielding glass sheet according to claim 1, wherein the base composition of the glass composition includes:
65 to 71 wt % $SiO_2$;
0 to 5 wt % $B_2O_3$;
1 to 3 wt % $Al_2O_3$;
3 to 10 wt % MgO;
5 to 15 wt % CaO;
10 to 15 wt % $Na_2O$;
0.5 to 2 wt % $K_2O$; and
0 to 0.5 wt % $SO_3$.

3. The ultraviolet-shielding glass sheet according to claim 1, wherein the coloring components of the glass composition comprise:
1.0 to 2.2 wt % $TiO_2$;
more than 2.4 wt % and 3.0 wt % or less $T\text{-}Fe_2O_3$, where $T\text{-}Fe_2O_3$ represents total iron oxide calculated as $Fe_2O_3$; and
50 to 95 wt. ppm cobalt oxide (CoO) calculated as CoO.

4. The ultraviolet-shielding glass sheet according to claim 3, wherein the coloring components of the glass composition consist essentially of:
1.3 to 2.1 wt % $TiO_2$;
50 to 95 wt. ppm cobalt oxide (CoO) calculated as CoO;
0 wt. ppm NiO; and
0 to 2 wt. ppm Se.

5. The ultraviolet-shielding glass sheet according to claim 4, wherein the coloring components of the glass composition consist of:
1.5 to 2.1 wt % $TiO_2$;
more than 2.4 wt % and 2.9 wt % or less $T\text{-}Fe_2O_3$, where $T\text{-}Fe_2O_3$ represents total iron oxide calculated as $Fe_2O_3$;
70 to 95 wt. ppm cobalt oxide (CoO) calculated as CoO;
0 wt. ppm NiO; and
0 to 2 wt. ppm Se.

6. The ultraviolet-shielding glass sheet according to claim 3, wherein the coloring components of the glass composition, as calculated per $cm^2$ of the glass sheet, include:
3 to 25 mg $TiO_2$;
10 to 25 mg $T\text{-}Fe_2O_3$, where $T\text{-}Fe_2O_3$ represents total iron oxide calculated as $Fe_2O_3$; and
40 to 140 μg cobalt oxide (CoO) calculated as CoO.

7. A strengthened glass sheet having a thickness of 1.0 to 3.5 mm, the strengthened glass sheet being obtained by thermally tempering the glass sheet according to claim 6.

8. A laminated glass sheet comprising a first glass sheet, an interlayer for glass lamination, and a second glass sheet, wherein
at least one of the first and second glass sheets is the ultraviolet-shielding glass sheet according to claim 6.

9. A vehicle window pane comprising the strengthened glass sheet according to claim 7.

10. A vehicle window comprising the window pane according to claim 9, wherein when air mass 1.5 sunlight as defined in JIS C 8904:2011 is applied to the vehicle window from outside of a vehicle, an ultraviolet intensity inside of the vehicle within a wavelength range up to 400 nm is 0.45 $J \cdot s^{-1} \cdot m^{-2}$ or less.

11. A vehicle window pane comprising the laminated glass sheet according to claim 8.

12. A vehicle window comprising the window pane according to claim 11, wherein when air mass 1.5 sunlight as defined in JIS C 8904:2011 is applied to the vehicle window from outside of a vehicle, an ultraviolet intensity inside of the vehicle within a wavelength range up to 400 nm is 0.45 $J \cdot s^{-1} \cdot m^{-2}$ or less.

13. The ultraviolet-shielding glass sheet according to claim 1, wherein the coloring components of the glass composition comprise:
0.9 to 2.2 wt % $TiO_2$;
more than 2.4 wt % and 3.0 wt % or less $T\text{-}Fe_2O_3$, where $T\text{-}Fe_2O_3$ represents total iron oxide calculated as $Fe_2O_3$;
50 to 95 wt. ppm cobalt oxide (CoO) calculated as CoO;
0 wt. ppm NiO; and
0 wt. ppm Se.

* * * * *